United States Patent
Schmitz et al.

(10) Patent No.: US 10,194,294 B2
(45) Date of Patent: Jan. 29, 2019

(54) METHOD FOR COLLECTIVELY COLLECTING DATA IN A MOBILE NETWORK, DATA ACQUISITION COMPUTER, AND MOBILE NETWORK MANAGEMENT UNIT FOR USE IN THE METHOD

(71) Applicant: VOLKSWAGEN AG, Wolfsburg (DE)

(72) Inventors: Steffen Schmitz, Wesel (DE); Andreas Kwoczek, Lehre (DE); Teodor Buburuzan, Braunschweig (DE); Thorsten Hehn, Wolfsburg (DE); Ernst Zielinski, Bochum (DE); Roman Alieiev, Stendal (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/863,010

(22) Filed: Jan. 5, 2018

(65) Prior Publication Data
US 2018/0192270 A1  Jul. 5, 2018

(30) Foreign Application Priority Data
Jan. 5, 2017 (DE) .................. 10 2017 200 100

(51) Int. Cl.
| | | |
|---|---|---|
| H04W 4/02 | (2018.01) | |
| H04W 4/38 | (2018.01) | |
| H04W 4/40 | (2018.01) | |
| H04W 4/46 | (2018.01) | |
| H04W 8/24 | (2009.01) | |
| H04W 72/04 | (2009.01) | |
| G08G 1/01 | (2006.01) | |
| H04L 12/26 | (2006.01) | |
| H04W 24/10 | (2009.01) | |

(52) U.S. Cl.
CPC ............ *H04W 4/46* (2018.02); *G08G 1/012* (2013.01); *G08G 1/0112* (2013.01); *G08G 1/0133* (2013.01); *G08G 1/0145* (2013.01); *H04L 43/0811* (2013.01); *H04W 4/025* (2013.01); *H04W 4/38* (2018.02); *H04W 4/40* (2018.02); *H04W 8/24* (2013.01); *H04W 24/10* (2013.01); *H04W 72/044* (2013.01); *H04W 72/0493* (2013.01)

(58) Field of Classification Search
CPC ..... H04W 24/10; H04W 4/70; H04W 72/085; H04W 88/02; H04W 24/02; H04W 24/08; H04W 4/02
See application file for complete search history.

(56) References Cited

U.S. PATENT DOCUMENTS

| | | | | |
|---|---|---|---|---|
| 7,739,705 B2 * | 6/2010 | Lee | ............. | H04H 60/31 725/10 |
| 9,565,625 B1 * | 2/2017 | MacNeille | ............. | H04W 48/18 |

(Continued)

FOREIGN PATENT DOCUMENTS

| | | |
|---|---|---|
| DE | 10133387 A1 | 1/2003 |
| DE | 102013205392 A1 | 10/2014 |

*Primary Examiner* — Dung Hong
(74) *Attorney, Agent, or Firm* — Barnes & Thornburg LLP

(57) ABSTRACT

A method for collective acquisition of data of road users including the selection of the mobile devices whose data are intended to be acquired and transmitted to the at least one data acquisition computer depending on at least the connection status of the mobile devices in the mobile radio network.

8 Claims, 4 Drawing Sheets

(56) References Cited

U.S. PATENT DOCUMENTS

| | | | | |
|---|---|---|---|---|
| 2007/0185645 A1* | 8/2007 | Chao | ............... | G08G 1/0104 |
| | | | | 701/533 |
| 2012/0252471 A1* | 10/2012 | Futaki | ............... | G01S 5/0018 |
| | | | | 455/450 |
| 2013/0275214 A1* | 10/2013 | Kote | ............... | G06Q 30/0255 |
| | | | | 705/14.53 |
| 2014/0018097 A1* | 1/2014 | Goldstein | ............... | G06F 19/00 |
| | | | | 455/456.1 |
| 2017/0066452 A1* | 3/2017 | Scofield | ............... | B60W 50/14 |
| 2017/0285656 A1* | 10/2017 | Kohlenberg | ............... | G05D 1/0276 |
| 2017/0318117 A1* | 11/2017 | Stenneth | ............... | H04Q 9/00 |
| 2018/0132060 A1* | 5/2018 | Dhulipalla | ............... | H04W 4/029 |

* cited by examiner

METHOD FOR COLLECTIVELY COLLECTING DATA IN A MOBILE NETWORK, DATA ACQUISITION COMPUTER, AND MOBILE NETWORK MANAGEMENT UNIT FOR USE IN THE METHOD

PRIORITY CLAIM

This patent application claims priority to German Patent Application No. 10 2017 200 100.3, filed 5 Jan. 2017, the disclosure of which is incorporated herein by reference in its entirety.

SUMMARY

Illustrative embodiments relate to a method for the collective acquisition of data in a mobile radio network. Illustrative embodiments also relate to a data acquisition computer and a mobile radio network management unit for use in the method.

BRIEF DESCRIPTION OF THE DRAWINGS

An exemplary embodiment is illustrated in the drawings and is explained in greater detail below with reference to the figures.

In the figures.

DETAILED DESCRIPTION

Figure 1:
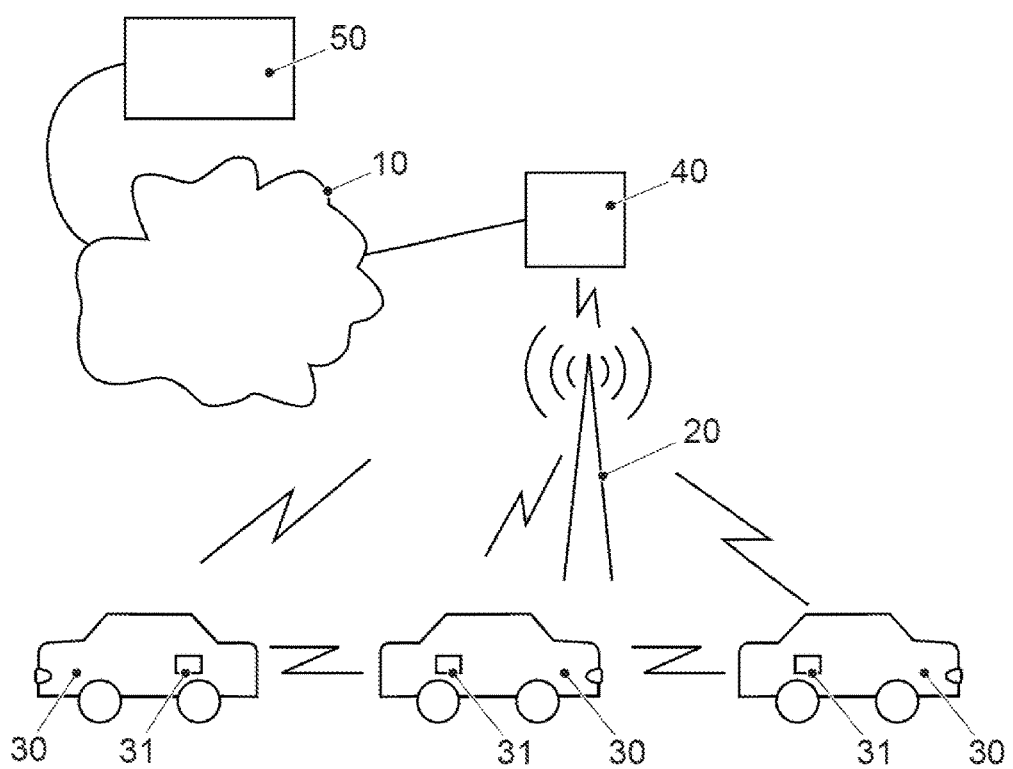
FIG. 1 shows the principle of vehicle communication via mobile radio.

For the scenario of vehicles which are equipped with radio communication modules and which communicate directly with one another in public road traffic, whether for cooperative or autonomous driving, or else for participation in mobile radio and linking to the Internet or supply with other data services, a high reliability in safety-critical applications is unremitting or very important for the customer.

In vehicle communication in the field of mobile radio networks, the following mobile radio technologies are currently applicable to vehicle communication: 3GPP-based UMTS, HSPA, LTE and the future 5G standards. LTE-V and 5G D2D are mentioned for direct vehicle communication.

As soon as data have to be transmitted in a periodically recurring manner, it is more efficient to reserve transmission resources for the transmission of these data and to allocate these transmission resources to the transmitting station. In present-day mobile radio standards this task is performed by a management unit, also known by the term scheduler. This management unit nowadays is typically arranged in the mobile radio base station. In the LTE mobile communication system, the base station is referred to for short as eNodeB, corresponding to "Evolved Node Basis".

All activities of the users within a cell—in mobile radio—are orchestrated by the base station. The scheduler, which is generally a software component in the base station, notifies each subscriber of the point in time and frequencies of the transmission frame at which it is permitted to transmit specific data. Its main task thus consists in the fair assignment of the transmission resources to the various subscribers. This avoids collisions, regulates data traffic in both transmission directions from a subscriber (uplink) and to a subscriber (downlink) and enables an efficient access for a large number of users. For direct vehicle communication, the scheduler stipulates what frequency resource is permitted to be used at what point in time for the direct communication.

Hitherto the network resources have been reserved depending on the current demand and the current position of the mobile radio subscriber station.

The article "Kooperative Kommunikationssysteme"["Cooperative communication systems"] from Strasse and Verkehr No. 3, March 2012, by M. Mohr and B. Oehry describes various application scenarios for cooperative driving (Car to Car Communication C2C) and also traffic management (Car to Infrastructure Communication C2I). The following is mentioned as an example in the field of C2I:

"One example of C2I communication is the transmission of position and sensor data of the vehicle about speed, acceleration or skidding via wireless communication nodes at the roadside, the so-called Roadside Units (RSUs). In return, the vehicles obtain current information about the state of the road such as black ice warnings or accident reports."

Modern vehicles are equipped with a large number of sensors such as rotational speed sensors, temperature sensors, acceleration sensors, pollutant emission sensors, tire pressure sensors, seat occupation sensors, cameras, radar, lidar, ultrasound, etc., which can supply data which are likewise of interest for traffic management or other applications. For this purpose, however, it is necessary to acquire the data from a large number of vehicles to obtain as up-to-date and comprehensive a picture as possible, e.g., concerning the constitution of the roadway. The acquisition of the data from all vehicles moving in an area encounters difficulties, however. Firstly, the acquisition of the data would place a very great load on the mobile radio network. Secondly, not all vehicles are linked equally well to the mobile radio network. This may be owing to the fact that the vehicle is situated at a position where shading of the mobile radio network is present or where overloading of the mobile radio network is present, etc. A multiple transmission of the data would then be necessary, which would place a further load on the mobile radio network.

JP-A-201382490 discloses a traffic information system in which the sensor data of the vehicles that are traveling in the relevant area are acquired. The acquired data are marked in each case with the current position of the vehicle and the acquisition time. The computer of the traffic monitoring system evaluates the acquired data and generates the desired traffic information, congestion message, other warning messages, etc., and makes available this information with an indication regarding the reliability of the information to the road users.

US 2013/0275214 A1 discloses acquiring the data regarding the type of sensors incorporated in the vehicle to send back to the vehicle advertising customized therefrom. The advertising may relate to further special equipment that may be of interest for retrofitting.

DE 10 2013 205 392 A1 discloses a backend for driver assistance systems of vehicles comprising a database. In this case, the backend device receives floating car data from a large number of vehicles. In this case, the backend, by an instruction to at least one of the vehicles, controls the volume or the data acquisition rate of the floating car data depending on the utilization/availability or bandwidth of the mobile radio network.

DE 101 33 387 A1 discloses a method for acquiring traffic data for a vehicle in which the vehicles supply position data to a control center via a communication unit, wherein traffic status messages are created from the position data of many vehicles. The method involves selectively switching on/off vehicles as messengers by a message from the control center to regulate the volume of information.

In comparison with the known solutions there is a need for a more efficient data acquisition method which avoids the drawbacks of the solutions described.

Here the focus is directed to the point of avoiding overloads of the network. More and more vehicles are traveling on roads and the vehicles are controlled cooperatively or autonomously. This per se already drastically increases the communication volume. An additional factor is that the media consumption and demand for information by the occupants of the vehicles also increase when the driver is relieved of the task of steering the vehicle. The mobile radio networks are therefore additionally loaded if only for these reasons.

This is achieved by a method for the collective acquisition of data in a mobile radio network, a data acquisition computer, and a mobile radio network management unit.

The solution consists in a more targeted acquisition of the data from mobile devices, taking into account the connection status of the mobile devices in the mobile radio network. In other words, those mobile devices whose connection status in the mobile radio network indicates that data acquisition is possible in an efficient manner are selected for the data acquisition. If the collective acquisition of the data is restricted to the transmission of the data of those stations which are well linked, erroneous transmissions and attendant multiple transmissions on account of connection problems are avoided.

Since the connection status is known only to the mobile devices themselves and to the mobile radio operator, this information can be interrogated either by the mobile devices themselves or by the mobile radio operator. The individual interrogation of the connection status by the individual mobile devices would place a great load on the mobile radio network and is therefore impracticable as described. Moreover, the individual mobile devices report some information regarding the connection status to the mobile radio operator anyway, and so a further dedicated interrogation of this information is regarded as inefficient.

In accordance with the proposal, therefore, the interrogation of the connection status data is carried out by the mobile radio operator. The mobile radio operator makes these data available, e.g., in the evolved packet core (EPC) of the provider network. Access to these data on the part of the data acquisition computer 50 is then carried out, e.g., via the Internet or via some other network. Wireless communication is not required for this purpose. The mobile radio network is then not subjected to more loading. Via the Internet, the connection data in combination can be downloaded; individual enquiries are not necessary for this purpose.

It is beneficial if the interrogation of the connection status of the mobile devices involves detecting the level of utilization of the mobile radio cell in which the mobile device is moving. This information reflects how much free network capacity in the area of the network is still available. The number of selected mobile devices can then be adapted in a targeted manner depending on the available network capacity.

It is beneficial if the interrogation of the connection status of the mobile devices involves detecting the respective measured connection quality. Here, e.g., the error rate can be detected. For an efficient transmission it is then possible to select the mobile devices whose error rate is low.

It is furthermore beneficial if the interrogation of the connection status involves detecting how far away the mobile device is from the cell boundary of the mobile radio cell. The further away the device is from the base station, the more difficult it becomes to reliably communicate the data. The energy efficiency during the transmission of the data also decreases.

The connection status of the mobile device may actually depend on the spectral efficiency with which the data can be transmitted or the energy efficiency with which the data can be transmitted. It is then beneficial if the criterion of the spectral efficiency of the data transmission or the energy efficiency of the data transmission is used as the connection status.

A further criterion for acquiring the connection status is the handover status of the mobile device. The handover status can be critical if the mobile device is moving at a cell boundary and it is not entirely clear whether, upon the communication of the data to be acquired, the device will still be in the cell in which it is currently registered.

In this context, it is beneficial if the mobile devices communicate their travel route to the mobile radio service provider. If the mobile radio service provider is informed of the travel route of a mobile device, it can calculate a predicted connection status which takes into account more accurately the cell in which the mobile device is expected to stay for the data acquisition.

A required accuracy of the data to be acquired can also be interrogated as the connection status of the mobile device. One example of this is, e.g., the acquisition of camera data. If the constitution of the roadway is intended to be determined with the aid of the camera data, then the quality of the recorded video images and the time resolution thereof are of great importance. However, these are greatly dependent on the speed at which the vehicle is traveling. Accordingly, the connection status would be good for a vehicle traveling slowly, but poor for a vehicle traveling rapidly.

In at least one disclosed embodiment of the method for collective data acquisition, it is beneficial if the data acquisition computer transmits a request to a mobile radio network management unit regarding the number and/or the criteria for selection of the mobile devices whose data are intended to be acquired, and wherein the selection of the mobile devices whose data are intended to be acquired is effected taking account of the communicated number and/or the criteria for selection by the mobile radio network management unit itself and the data acquired by the selected mobile devices are forwarded to the data acquisition computer. Access to these acquired data on the part of the data acquisition computer is then carried out, e.g., via the Internet or via some other network, e.g., by download. The mobile radio network, however, is then not subjected to more loading.

In another disclosed embodiment of the method, the mobile radio network management unit makes the connection status of the mobile devices available to the data acquisition computer by remote access and the selection of the mobile devices whose data are intended to be acquired is effected by the data acquisition computer. The selection of the mobile devices whose data are intended to be acquired is communicated to the mobile radio network management unit by the data acquisition computer and the data acquired by the selected mobile devices are forwarded to the data acquisition computer by the mobile radio network management unit. Here the mobile radio network management unit in practice only provides an interface, e.g., as an application programming interface (API), but is freed of the task of selecting the mobile devices whose data are intended to be acquired. Via the Internet, the connection status data in combination can be downloaded; individual requests are not necessary for this purpose.

The present description illustrates the principles of the disclosure. It thus goes without saying that those skilled in the art will be able to design different arrangements which, although not explicitly described here, nevertheless embody principles of the disclosure and are likewise intended to be protected within their scope.

FIG. 1 shows the principle of vehicle communication by mobile radio. The vehicles are provided with the reference numeral 30.

The term vehicle is understood as a collective term, be it for motor vehicles having an internal combustion engine or an electric motor, be it for bicycles with and without an electric motor or other muscle-powered vehicles, be it for vehicles having one, two, four or more wheels, be it for motorcycles, automobiles, trucks, buses, agricultural vehicles or construction machines. The enumeration is not exhaustive and also encompasses further categories of vehicle.

The vehicles in FIG. 1 are each equipped with an on-board unit 31, which serves as a transmitting and receiving unit for the communication in a mobile radio network. The on-board unit is part of a mobile radio network subscriber station within the meaning of the disclosure. The mobile radio network subscriber station is referred to hereinafter for short as mobile device. All messages from the vehicles (uplink) and to the vehicles (downlink) are either conducted via a base station 20 serving a mobile radio cell or in the case of direct vehicle communication (sidelink) are exchanged directly between the vehicles. If the vehicles are situated within the mobile radio cell, they are logged on or registered at the base station 20. If they leave the mobile radio cell, they are handed over to the neighboring cell (handover) and accordingly logged off or deregistered from the base station 20. The base station 20 also provides access to the Internet, such that the vehicles 30 and/or all other mobile devices in the mobile radio cell are supplied with Internet data. To that end, the base station 20 is connected to the EPC 40 (Evolved Packet Core) via the so-called S1 interface. A data acquisition computer 50 is also able to be reached via the Internet 10 or some other wide area network WAN. The data acquisition computer 50 may be assigned to a traffic monitoring center. In another example, it serves for monitoring a fleet of a company, e.g., vehicle manufacturer, logistics company, car rental company, etc. In the context of the proposal, the data acquisition computer has the task of collective data acquisition. In other words, specific data that can be supplied by a vehicle are acquired and stored for further processing. Present-day vehicles are equipped with a large number of sensors, including rotational speed sensors, temperature sensors, acceleration sensors, pollutant emission sensors, tire pressure sensors, seat occupation sensors, cameras, radar, lidar, ultrasound, etc. The enumeration is not exhaustive. However, it is also possible to acquire data which are not measured directly by a sensor, thus, e.g., derived variables such as consumption values, wear values, status of the safety systems or else a planned travel route, participation in vehicle platooning, number and type of the sensors incorporated in the vehicle, etc. The further processing of the acquired data can take place in diverse ways. It can take place through statistical evaluation. It can serve the purpose of fleet management. It can serve the purpose of traffic monitoring or it can serve some other official purpose, including environment protection, accident prevention, criminal prosecution, etc.

Such mobile radio technologies are standardized and in this regard reference is made to the corresponding specifications of mobile radio standards. As one modern example of a mobile radio standard, reference is made to the 3GPP initiative and the LTE (Long Term Evolution) standard. Many of the associated ETSI specifications are currently available in version 13. The following are mentioned as an example: ETSI TS 136 213 V13.0.0 (2016-05); Evolved Universal Terrestrial Radio Access (E-UTRA); Physical layer procedures (3GPP TS 36.213 version 13.0.0 Release 13).

LTE primarily denotes high transmission rates and short reaction times. In the case of LTE, the increase in the transmission rate is achieved by better modulation methods, more flexible frequency utilization and larger channel bandwidths. Transmission rates of more than 300 Mbit/s in the downlink and 75 Mbit/s in the uplink are currently achieved in the case of LTE according to the specification per 20 MHz band computationally and minus the overhead.

The transmission speed of LTE is essentially dependent on the frequency range, the channel width, the distance to the base station 20 and the number of subscribers within the mobile radio cell. The transmission rate per subscriber turns out to be all the lower, the more users simultaneously use the bandwidth.

The frequency range around 800 MHz was originally provided for analog UHF television channels. This frequency range became free as a result of the switchover of terrestrial TV reception to DVB-T/DVB-T2 and the associated shutdown of analog television broadcasting by radio. This frequency range is therefore also referred to as a digital dividend. In addition, in the frequency range around 1800 MHz all network operators have available frequencies that are permitted to be used for LTE.

While the frequencies around 2600 MHz are principally used at heavily frequented places (hotspots) in large cities, mobile radio operators have an obligation to supply the white spots of the broadband expansion (areas without coverage) with the 800 MHz frequency range. Depending on need and demand it should thus be expected that this frequency range will be oversubscribed sometime and the frequencies around 2600 MHz will have to be employed in the countryside, too.

However, the higher frequency range has a smaller range. Of all three frequency ranges the 800 MHz band offers the largest range and manages with fewer base stations for the network coverage. The distance between base station and terminal is not permitted to be more than 10 kilometers, however, in the case of LTE.

So that a plurality of mobile radio devices can transmit data simultaneously, LTE operates with scalable and individual channels. That means specifically that during resource allocation the frequency spectrum is divided and parts of the spectrum are allocated to individual devices for a specific time.

The OFDMA technique (Orthogonal Frequency Division Multiple Access) is used for the downlink. This involves use of the known multi-carrier transmission technique OFDM (Orthogonal Frequency Division Multiplexing), in which data symbols are modulated onto the individual carriers by QPSK (Quadrature Phase-Shift Keying) or QAM (Quadrature Amplitude Modulation). In OFDMA, the available frequency band is divided into many narrow bands (channels). The bandwidth is utilized flexibly to extract the utmost transmission power from the frequencies.

A frequency band having a bandwidth of 10, 15 or 20 MHz is divided into sub-carriers each of 15 kHz. 12 sub-carriers in each case are combined to form a resource block (RB), which is the smallest unit of what can be allocated to an LTE device. A device can allocate one or a plurality of resource blocks depending on the direction. The number depends on the capacity utilization of the cell and the signal quality. The upper limit results from the width of the frequency block used by the base station. That is 50 resource blocks in the case of a 10 MHz frequency block, and 100 in the case of 20 MHz.

The transmission of a block is fixed temporally at 10 ms (frame). That is 100 blocks per second. Each frame in turn consists of 10 subframes. One transport block can be transmitted per subframe. The transport block is of varying size depending on the signal quality. The size of the transport block essentially depends on the signal quality. The signal quality determines what modulation is used, what the ratio is between payload data and error correction (code rate) and how many resource blocks are used. In this case, these three parameters are directly related to one another.

Specific algorithms select the suitable channels and take account here of the influences from the environment. In this case, only the carriers which are the most expedient for the user at the latter's respective location may be used for transmission.

The SC-FDMA (Single Carrier Frequency Division Multiple Access) technique is used for the uplink. That is a single-carrier access method, which otherwise is very similar to OFDMA. SC-FDMA has smaller power fluctuations and makes possible simpler power amplifiers. That primarily conserves the rechargeable battery of mobile devices.

LTE also operates with spatially separated data streams. The LTE specification provides four antennas in the base station and two antennas in the terminals. The transmission signal is forwarded to a plurality of transmitting antennas for transmission. The reception signals are received by two antennas. This technique is referred to as multiple input multiple output (MIMO). A better signal is then calculated from both signals. A better data throughput is thus achieved because both transmitting and receiving paths are not subject to the same disturbances (losses and interference). In addition, LTE uses further techniques such as the shared channel principle, and also hybrid automatic repeat request (HARQ) and adaptive modulation and coding (AMC).

Figure 2:
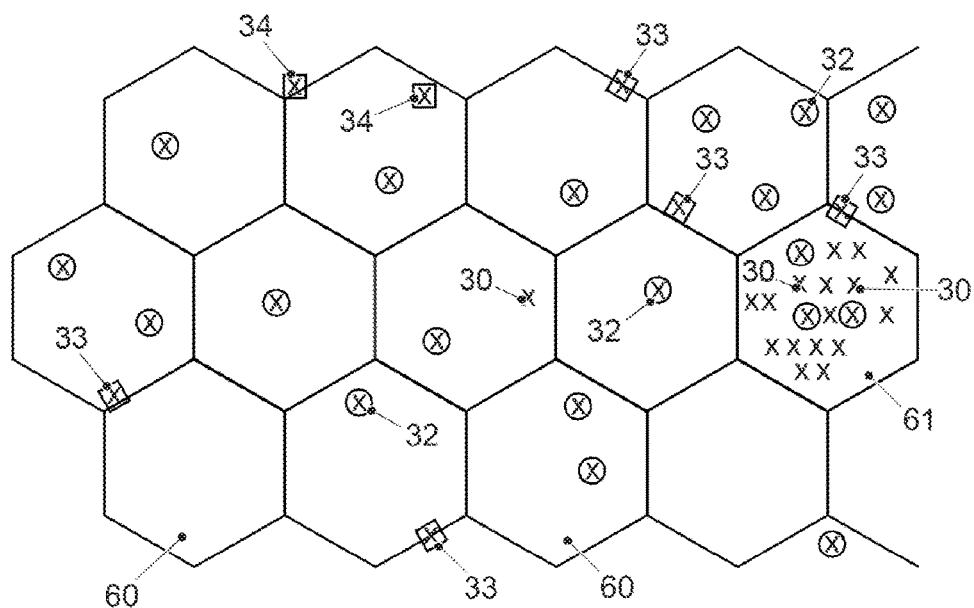
FIG. 2 shows an example of the selection of a number of mobile devices with varying utilization of a number of mobile radio cells.

FIG. 2 shows a typical application of the disclosure. It shows a number of mobile radio cells 60, each illustrated as a hexagon. The position of the mobile devices 30 in the respective mobile radio cell 60 is marked in each case by a cross. A mobile device is understood here to mean a device that can be registered in a mobile radio cell, that is to say, e.g., a mobile telephone, a tablet computer, an IoT device (Internet of Things) which is linked to the Internet via mobile radio, a vehicle 30 equipped with a mobile radio modem 31, etc. FIG. 2 shows the geographical distribution of the mobile devices 30 in the individual cells. Some of the mobile devices are enclosed by a circle. This indicates that the relevant mobile device was selected for the data acquisition. These devices are provided with the reference numeral 32. The selection process for determining the mobile devices 30 whose data are intended to be acquired is explained in greater detail below.

In accordance with the proposal, the connection status of the mobile devices in the mobile radio network is used as a selection criterion. Since the connection status is known only to the mobile devices 31 themselves and to the mobile radio operator, this information can be interrogated either by the mobile devices 31 themselves or by the mobile radio operator. The individual interrogation of the connection status by the individual mobile devices 31 would place a great load on the mobile radio network and is therefore impracticable. Moreover, the individual mobile devices report some information regarding the connection status to the mobile radio operator anyway, and so a further dedicated interrogation of this information is regarded as inefficient. The information reported to the mobile radio operator by the mobile devices 31 regarding the connection status will be discussed in even greater detail below.

The interrogation of these data at the mobile radio operator is therefore favored. The mobile radio operator makes these data available, e.g., in the EPC 40. Access to these data on the part of the data acquisition computer 50 is then carried out, e.g., via the Internet or via some other network. The mobile radio network is then, however, not subjected to more loading. Via the Internet, the connection data in combination can be downloaded; individual enquiries are not necessary for this purpose.

Figure 3:
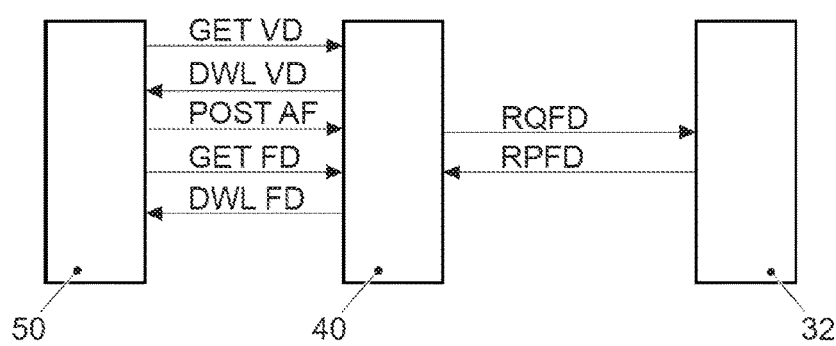
FIG. 3 shows the information exchange between a data acquisition computer, a mobile radio network management unit, and a mobile radio network subscriber station in a first exemplary embodiment.

FIG. 3 shows an exemplary embodiment for this case, that is to say where the data acquisition computer 50 accesses the connection data made available by the mobile radio operator. Firstly, the data acquisition computer 50 transmits via the Internet an http GET VD enquiry to a web server of the mobile radio network management unit 40. In response to this enquiry, the connection data are then downloaded in the operation DWL VD. The analysis of the connection data takes place in the data acquisition computer 50. The evaluation can take place taking account of one or more criteria from among the following criteria:

capacity utilization of the mobile radio cell
connection quality
distance to the cell boundary
handover status
accuracy of the sensor data to be supplied
spectral efficiency with which the data can be supplied
energy efficiency with which the data can be supplied.

It can be seen in FIG. 2 that, e.g., the cell 61 is utilized to a high level. A transmission of the data of the mobile devices in the radio cell 61 would overload the mobile radio network, with the result that only some of the mobile devices in this cell are selected for the data acquisition. The mobile devices 33 are situated at the cell boundary. Therefore, they are no longer linked efficiently. This relates to the spectral efficiency of the data transmission and also to the energy efficiency. Therefore, they are not selected for the data acquisition. The mobile devices 33 are identified by being enclosed by a rhombus in FIG. 2. The mobile devices 34 have a critical handover status and are likewise not selected. They are marked by being enclosed by a rectangle. A critical handover status is present if the receiving cell has a high capacity utilization or it should be expected for other reasons that the handover process might take up a great deal of time.

If the mobile devices are equipped with a navigation function and register their travel route at the mobile radio operator, this information can likewise be communicated to the data acquisition computer 50 and then also be taken into account there for the selection. It is then possible to select a mobile device 34 despite the critical handover status because its predicted connection status is good enough.

Next, the data acquisition computer 50 communicates the information regarding the selection of the vehicles to the mobile radio network management unit 40. This is done with the aid of a corresponding http POST AF message. The mobile radio network management unit 40 uses this information to acquire the data from the selected vehicles. To that end, it transmits a corresponding message RQ FD to the selected vehicles. In this message, the type of desired data can be precisely designated. Moreover, it is possible to specify the point in time and the period of time regarding when and for how long the desired data are intended to be supplied. One possible application is, e.g., the monitoring of the state of the roadway (e.g., for a warning against potholes) with the aid of the camera sensors. The selected vehicles return the requested data to the mobile radio network management unit 40. This operation is designated by RP FD in FIG. 3. For camera sensors, e.g., a video stream will then be returned. This is also an example of the selection criterion of accuracy of the sensor data. If the vehicle is traveling very rapidly, the temporal resolution of the video images is insufficient for reliable identification of potholes. In that case the vehicle is not selected for the data acquisition regarding identification of potholes.

Figure 4:
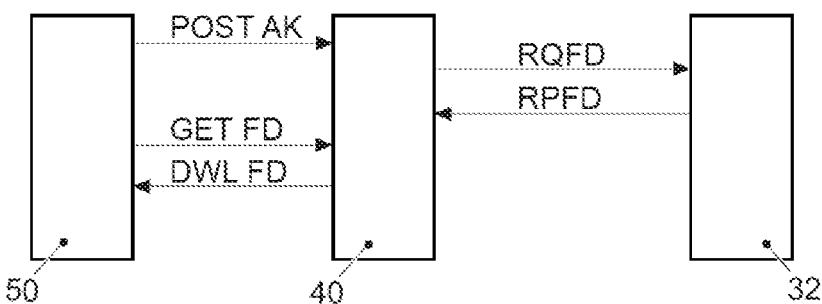
FIG. 4 shows the information exchange between a data acquisition computer, a mobile radio network management unit, and a mobile radio network subscriber station in a second exemplary embodiment.

FIG. 4 shows an exemplary embodiment for the case where the selection of the vehicles takes place in the mobile radio network management unit 40. Here the criteria for the selection thus have to be transmitted to the mobile radio network management unit 40 by the data acquisition computer 50. For this purpose, the connection status of the vehicles does not have to be transmitted to the data acquisition computer 50. Firstly, the selection criteria are communicated to the mobile radio network management unit 40. The corresponding http POST message is designated by POST AK in FIG. 4. The mobile radio network management unit 40 effects the selection on the basis of the communicated selection criteria. The required connection status data of the individual mobile devices are present at the mobile radio network management unit 40. This is followed by the request RQ FD at the selected vehicles 32. The selected vehicles 32 report the requested data to the mobile radio network management unit 40 in the operation RP FD. This is then also followed by the access to the acquired data on the part of the data acquisition computer 50 with the GET request GET FD and the delivery of the requested data in the operation DWL FD, as already previously in the first exemplary embodiment.

Figure 5:
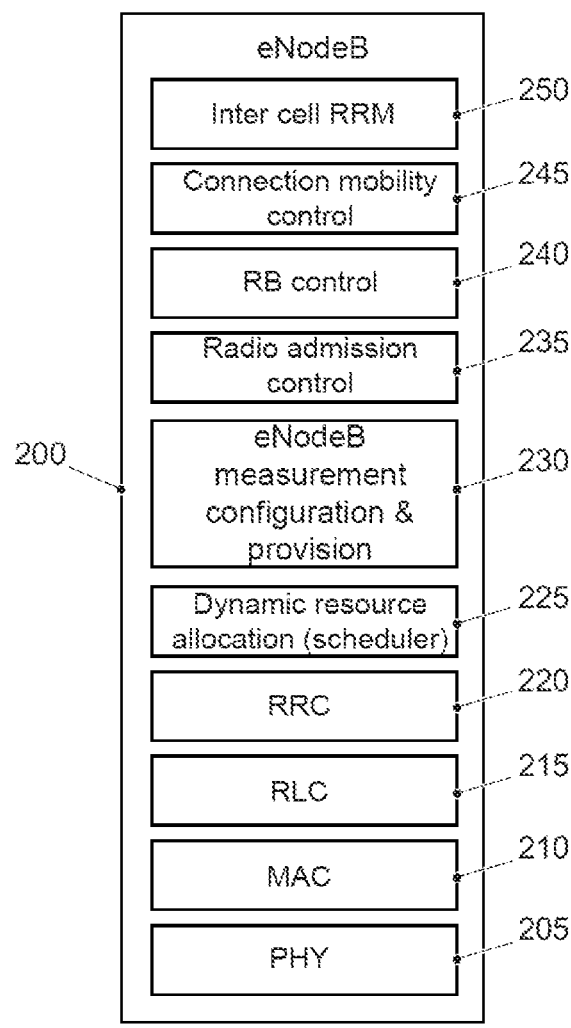
FIG. 5 shows a typical protocol stack of an LTE base station eNodeB.

The allocation of the transmission resources takes place according to the LTE standard with the aid of a so-called "scheduler", which corresponds to a management unit that manages the transmission resources. The scheduler is arranged in the base station in accordance with the LTE standard. The base station is referred to as eNodeB in the LTE standard and is specified accordingly. The protocol stack of such a base station eNodeB is shown in FIG. 5. The reference numeral 200 denotes the entirety of the various protocols implemented. The reference numeral 205 denotes the Physical layer, that is to say layer 1 of the ISO/OSI layer model of data communication. The Data Link layer, layer 2, is realized in LTE by the layers 210 Medium Access Control Layer, 215 Radio Link Control Layer and 220 Radio Resource Control Layer. Established thereabove is the already mentioned functionality of the scheduler, that is to say of the management unit that performs resource allocation. This unit is designated by the reference numeral 225. Established thereabove is a layer 230, which performs the evaluation of measurements and the implementation of configurations for the base station eNodeB. The connection quality data which are necessary for determining the connection status are collected and processed in this layer. Channel Quality Indicator (CQI) reports, Received Signal Strength Indicator (RSSI) reports and Reference Signal Received Quality (RSRQ) reports are delivered here by the mobile devices. For the details, reference is made here to the LTE standard expressly also within the meaning of the disclosure.

The reference numeral 235 denotes the Radio Admission Control RAC layer. The layer RBC corresponding to Radio Bearer Control has the reference numeral 240. The layers Connection Mobility Control CMC 245 and Inter Cell Radio Resource Management RRM 250 are also arranged thereabove. The individual layers of the network management unit 20 are explained in greater detail in the standard. The layer 230, which carries out the evaluation of measurements and the implementation of configurations, is of interest for the present disclosure. For this reason, more detailed explanations are given below principally with regard to the layer 230. With regard to the other layers listed, reference is expressly made to the LTE standard regarding the disclosure of these layers.

For this purpose it is pointed out that FIG. 5 was taken in this form from the LTE standard. It concerns the specification ETSI TS 136 211 V13.1.0. The title of the specification reads: LTE; Evolved Universal Terrestrial Radio Access (E-UTRA); Physical Channels and Modulation (3 GPP TS 36.211 Virgin 13.1.0 Release 13).

The layer 230 will carry out the 2nd stage of QoS monitoring provided for the disclosure, in other words, the provision of information about the state of the network. This information is transmitted to the mobile radio subscribers. In this case, provision can be made for transmitting the information only to those subscribers that have registered for this particular QoS monitoring service.

Figure 6:
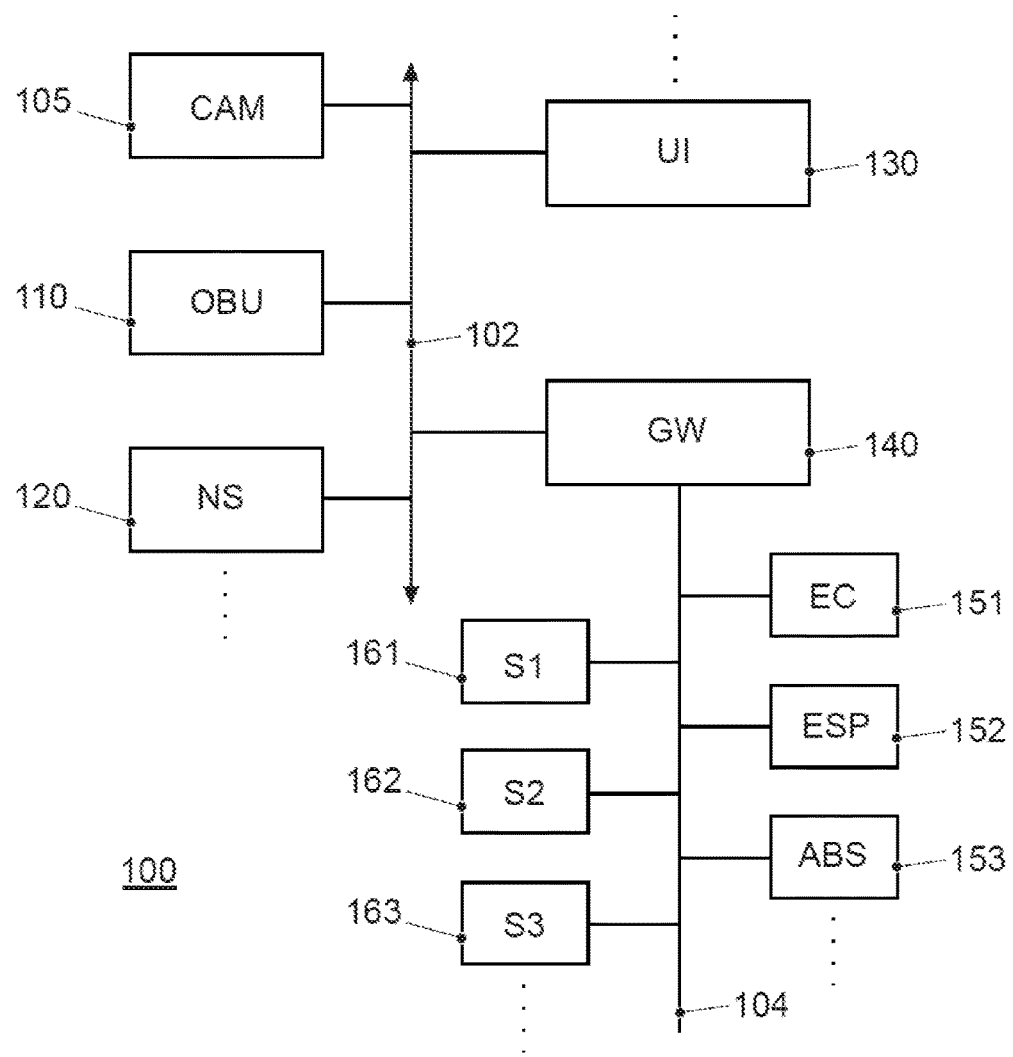
FIG. 6 shows a block diagram of the vehicle electronics of a motor vehicle.

FIG. 6 shows the typical construction of motor vehicle electronics 100 of a modern motor vehicle 30. The reference numeral 151 denotes an engine controller. The reference numeral 152 corresponds to an ESP controller and the reference numeral 153 denotes an ABS controller. Further controllers such as transmission controller, airbag controller, etc. may be present in the motor vehicle. The networking of such controllers is typically effected by the CAN (Controller Area Network) bus system 104, which is standardized as an ISO standard, ISO 11898. Since various sensors are installed in the motor vehicle and they are no longer only connected to individual controllers, such sensor data are likewise transmitted to the individual controllers via the bus system 104. Examples of sensors in the motor vehicle are wheel rotational speed sensors, steering angle sensors, acceleration sensors, rate-of-rotation sensors, tire pressure sensors, distance sensors, etc. The various sensors with which the vehicle is equipped are designated by the reference numerals 161, 162, 163 in FIG. 6.

However, the modern motor vehicle may comprise even further components such as video cameras 105, e.g., as reversing camera or as driver monitoring camera or else as front camera for observing the traffic situation. As an example of further components, mention is also made of a radar device for realizing a radar cruise control or for realizing a distance warning or collision warning device.

For some years, driver assistance systems have been offered which capture the driving environment by radar, lidar or video sensor technology, form an internal representation of the driving situation by interpreting these sensor data and, on the basis of this knowledge, perform increasingly demanding functions by providing information and warning for the driver through to targeted interventions in the vehicle guidance. In this regard, by way of example, longitudinal guidance on well structured roads, such as motorways, can be performed automatically for a high proportion of time by an ACC (Adaptive Cruise Control) system equipped with radar sensor technology.

The motor vehicle then also contains even further electronic devices. The latter are arranged more in the region of the passenger compartment and are often also operated by the driver. Examples include a user interface device with which the driver can select driving modes, but can also operate traditional components. These include gear selection and also flashing indicator control, windshield wiper control, light control, etc. This user interface arrangement is provided with the reference numeral 130. The user interface arrangement 130 is often also equipped with a rotary/pushbutton switch via which the driver can select the various menus that are displayed on a display in the cockpit. On the other hand, a touch-sensitive display also falls within this category. Even the voice input for operation assistance falls within this area.

A navigation system 120 is often differentiated therefrom, the navigation system likewise being incorporated in the area of the cockpit. The route displayed on a map may, of course, likewise be represented on the display in the cockpit. Further components, such as a hands-free device, may be present, but are not illustrated in more specific detail. The reference numeral 110 additionally denotes an on-board unit. This on-board unit 110 corresponds to a communication module via which the vehicle can receive and transmit mobile data. As described, this can be a mobile radio communication module, e.g., according to the LTE and LTE-V standards.

The devices in the passenger compartment are likewise internetworked via a bus system, designated by the reference numeral 102. This can be, e.g., the high-speed CAN bus system according to the ISO 11898-2 standard, although here in the embodiment for data transmission at a higher data rate between infotainment devices. The gateway 140 is provided for the purpose that vehicle-relevant sensor data are intended to be transmitted via the communication module 110 to a different vehicle or to a different central computer. The gateway is connected to the two different bus systems 102 and 104. The gateway 140 is designed to convert the data which it receives via the CAN bus 104 such that they are converted into the transmission format of the high-speed CAN bus 102, with the result that they can be distributed in the packets specified there. For forwarding these data externally, the communication module 110 is equipped to receive these data packets and convert them in turn into the transmission format of the communication standard correspondingly used. The gateway 140 can also be used as computation mechanism for other tasks.

It should be understood that the proposed method and the associated devices can be implemented in various forms of hardware, software, firmware, special processors or a combination thereof. Special processors may comprise application-specific integrated circuits (ASICs), a reduced instruction set computer (RISC) and/or field programmable gate arrays (FPGAs). The proposed method and the device may be implemented as a combination of hardware and software. The software may be installed as an application program on a program memory device. This typically involves a machine based on a computer platform which comprises hardware such as, for example, one or more central processing units (CPUs), a random access memory (RAM) and one or more input/output (I/O) interface(s). In addition, an operating system is typically installed on the computer platform. The various processes and functions described here may be part of the application program, or a part that is executed by the operating system.

The disclosure is not restricted to the exemplary embodiments described here. There is latitude for various adaptations and modifications which the person skilled in the art, on the basis of the latter's expert knowledge, would take into consideration as also being associated with the disclosure.

One modification that will be explicitly mentioned is that the data acquisition computer 50 is not linked to the mobile radio network via the Internet 10, but rather is part of the EPC 40 as an edge cloud application. At specific locations of the mobile radio network there are then further data acquisition computers 50 which are responsible in each case for a specific area of the mobile radio network for the data acquisition of the data from the mobile devices positioned in the respective area.

The invention claimed is:

1. A method for the collective acquisition of data, the method comprising:
   acquiring data by mobile devices each equipped with a radio communication module, wherein the data are transmitted via mobile radio network to at least one data acquisition computer with the aid of the radio communication modules; and
   selecting the mobile devices whose acquired data are to be transmitted to the at least one data acquisition computer based on at least the connection status of the mobile devices in the mobile radio network,
   wherein the connection status of a mobile device depends on at least one of the level of utilization of the mobile radio cell in which the mobile device moves, the measured connection quality, how far away the mobile device is from the cell boundary of the mobile radio cell, the handover status of the mobile device, the required accuracy of the data to be acquired, and the spectral efficiency with which the data is transmitted or the energy efficiency with which the data is transmitted.

2. The method of claim 1, wherein the mobile devices communicate their travel route to the mobile radio service provider and the connection status is a connection status predicted based on the communicated travel route.

3. The method of claim 1, further comprising the data acquisition computer transmitting a request to a mobile radio network management unit regarding the number and/or the criteria for selection of the mobile devices whose data are to be acquired, wherein the selection of the mobile devices whose data are to be acquired takes into account the communicated number and/or the criteria for selection by the mobile radio network management unit depending on at least the connection status of the mobile devices themselves such that the data acquired by the selected mobile devices are forwarded to the data acquisition computer.

4. The method of claim 1, further comprising the mobile radio network management unit making the connection status of the mobile devices available to the data acquisition computer by remote access and the selection of the mobile devices whose data are to be acquired takes into account the at least the connection status of the mobile devices, wherein the selection of the mobile devices whose data are intended to be acquired is communicated to the mobile radio network management unit by the data acquisition computer and the data acquired by the selected mobile devices are forwarded to the data acquisition computer by the mobile radio network management unit.

5. A data acquisition computer for collective acquisition of data, the data acquisition computer comprising:
   a transmitting and receiving unit for exchanging messages with a mobile radio network management unit,
   wherein the data acquisition computer remotely accesses the connection status of the mobile devices, which is made available by the mobile radio network management unit, to select mobile devices with data to be acquired based on at least the connection status of the mobile devices, to communicate the selection of the mobile devices with data to be acquired to the mobile radio network management unit, and to receive the data acquired by the selected mobile devices via the mobile radio network management unit, and
   wherein the connection status of a mobile device depends on at least one of the level of utilization of the mobile radio cell in which the mobile device moves, the measured connection quality, how far away the mobile device is from the cell boundary of the mobile radio cell, the handover status of the mobile device, the required accuracy of the data to be acquired, and the spectral efficiency with which the data is transmitted or the energy efficiency with which the data is transmitted.

6. A mobile radio network management unit for use for collective acquisition of data, the mobile radio network management unit comprising:
   a transmitting and receiving unit for exchanging messages with a data acquisition computer, and
   a transmitting and receiving unit for exchanging messages with the mobile devices,
   wherein the mobile radio network management unit makes available the data about the connection status of the mobile devices for remote access by the data acquisition computer and receives a connection-status-dependent selection of the mobile devices with data to be acquired from the data acquisition computer and receives the data from the selected mobile devices and forwards the data to the data acquisition computer, and
   wherein the connection status of a mobile device depends on at least one of the level of utilization of the mobile radio cell in which the mobile device moves, the measured connection quality, how far away the mobile device is from the cell boundary of the mobile radio cell, the handover status of the mobile device, the required accuracy of the data to be acquired, and the spectral efficiency with which the data is transmitted or the energy efficiency with which the data is transmitted.

7. The mobile radio network management unit of claim 6, wherein the mobile radio network management unit receives from the data acquisition computer a request regarding the number and/or the criteria for selection of the mobile devices whose data are to be acquired, selects the mobile devices based on at least the connection status of the mobile devices themselves and receives the data from the selected mobile devices and forwards them to the data acquisition computer.

8. A method for the collective acquisition of data, the method comprising:
   acquiring data by mobile devices each equipped with a radio communication module, wherein the data are transmitted via mobile radio network to at least one data acquisition computer with the aid of the radio communication modules; and
   selecting the mobile devices whose acquired data are to be transmitted to the at least one data acquisition computer based on at least the connection status of the mobile devices in the mobile radio network,
   wherein the mobile devices communicate their travel route to the mobile radio service provider and the connection status is a connection status predicted based on the communicated travel route.

* * * * *